MUTUALLY SETTABLE AUTOMATIC REMINDER SYSTEM

Filed April 22, 1968 3 Sheets-Sheet 1

Joseph B. Riley
INVENTOR.
BY
Attorney

MUTUALLY SETTABLE AUTOMATIC REMINDER SYSTEM

Joseph B. Riley
INVENTOR.

BY Roger L. Martin
Attorney

March 31, 1970 J. B. RILEY 3,504,121

MUTUALLY SETTABLE AUTOMATIC REMINDER SYSTEM

Filed April 22, 1968 3 Sheets-Sheet 3

| HOUR | DIGIT | HOUR | DIGIT | MINUTE | DIGIT |
|---|---|---|---|---|---|
| 1:00 | 1 | 7:00 | 7 | 10 | 1 |
| 2:00 | 2 | 8:00 | 8 | 20 | 2 |
| 3:00 | 3 | 9:00 | 9 | 30 | 3 |
| 4:00 | 4 | 10:00 | 0 | 40 | 4 |
| 5:00 | 5 | 11:00 | 01 | 50 | 5 |
| 6:00 | 6 | 12:00 | 02 | | |

INVENTOR.
JOSEPH B. RILEY
BY Harvey C. Nienow
ATTORNEY 3,504,121
MUTUALLY SETTABLE AUTOMATIC REMINDER SYSTEM Joseph B. Riley, 260 Melissa Drive, Titusville, Fla. 32780

Continuation-in-part of application Ser. No. 253,469, Jan. 23, 1963. This application Apr. 22, 1968, Ser. No. 733,185
Int. Cl. H04m *17/10*
U.S. Cl. 179—6 9 Claims

ABSTRACT OF THE DISCLOSURE

This application contains a technical disclosure of an automatic reminder system for use with telephone systems, in the form of a unit attachable to dial telephone equipment and circuitry, intended for use by motels and hotels, whereby occupants thereof may manually actuate such units and open the telephone circuits, after which the dial of the telephone instrument may be utilized to set into the unit a call back time, at which time the occupant will be signaled. There is further disclosed the manner by which the uints are provided with switching means whereby occupants may not only manually activate and deactivate the reminder system, but may also cancel or correct an earlier call back setting, and the manner whereby the units are further provided with indicating lights for assisting the occupant in operation of the units.

CROSS-REFERENCE TO RELATED APPLICATION

This application is a continuation-inpart of application Ser. No. 253,469, filed Jan. 23, 1963 for "Telephone Systems" which is now abandoned.

BACKGROUND OF THE INVENTION

The present invention relates generally to telephone systems, and more particularly to an automatic reminder system for signaling a given telephone instrument at a preselected time.

Many significant technological advances have been made within the past several decades in the field of transportation, so that today it is possible to travel considerable distances within relatively short periods of time. As a result, within recent years the amount of traveling for both pleasure and business purposes, has increased appreciably. As a direct result, the hotel and motel industry has enjoyed a corresponding increase in business. In fact, many new modern motels and hotels have come into existance within the past several decades.

In order for a guest of a hotel or motel to make business or social appointments, it is frequently necessary to employ a reminder system of one kind or another. Heretofore, such reminder system has required the services of a telephone operator for noting the time at which a hotel guest wishes to be notified, and thereafter, at the proper time for making a telephone call to the room or suite occupied by the guest. In this manner, the guest is reminded of the fact that he requested to be notified at the present time.

Such prior reminder systems for notifying hotel and motel guests has been costly and time consuming in that it requires the services of a switchboard operator and the use of the telephone apparatus for a considerable period of time. In relatively large hotels and motels having many guests, the reminding services is very costly since many of the guests use such service.

While devices intended for purposes somewhat similar to those of this invention have heretofore been proposed, such devices are generally impractical, inoperative and/or ineffective in accomplishing their desired results. For example, U.S. Patent 1,302,767 to Clausen et al and British Patent 915,212 disclosed generally telephone exchange systems in which there is provided an impulse storing mechanism at a central office with which the subscriber may be connected through regular trunk lines and within which impulses representing call back numbers and desired time-of-calling hours and minutes may be stored, this mechanism operating to call the subscriber back through regular trunk lines at the desired time. Generally however, in most of such systems, the central office equipment and available trunk lines can quickly be exhausted or busy for more than but a few subscribers; no reliable indications of actual storing of the correct call back and time of calling impulses are available to the subscribers; no fractional means of making changes or correcting errors in the stored impulses at a later time are available, and there is no control possible of malicious storing of signals which might be undesired and obnoxious to the subscriber, all as a result of such mechanisms not being under the direct manual control nor located for visual control in close proximity to the subscribers. Additionally such systems do not permit of ease of connection and disconnection in large numbers and interchangeably with wide varieties of local telephone systems having various types of equipment and power supplies, and frequently not interconnected with the central offices, such as are often utilized by motels and hotels.

SUMMARY OF THE INVENTION

It is an object of the present invention to provide an automatic system for use with telephone apparatus for reminding persons at a given time.

Another object of the present invention is to provide an automatic reminder system which is operable with ordinary telephone apparatus but does not tie up the services thereof for an appreciable period of time.

Another object of the present invention is to provide an automatic reminder system as characterized above which can be automatically present, as desired, merely by proper manipulation of manual switches and normal operation by the usual dial apparatus of the particular telephone instrument.

Another object of the present invention is to provide an automatic reminder system as characterized above which, upon occurance of the preselected time, signals the given telephone instrument and transmits thereto a prerecorded message.

Another object of the present invention is to provide a reminder system as characterized above which utilizes the dial mechanism of a telephone instrument for setting such system in accordance with the various hours and fractions thereof.

Another object of the present invention is to provide a reminder system as characterized above which can be adapted to substantially any existing telephone system.

Another object of this invention is to provide a reminder apparatus which can be applied to existing telephone equipment without, in any way, altering the appearance or operation of the latter.

Another object of this invention is to provide a telephone reminder system as characterized above which is simple and inexpensive to manufacture, and which is rugged and dependable in operation.

Still another object of this invention is to provide an automatic reminder system which utilizes units which may be easily connected and disconnected with wide varieties of local telephone systems such as are found in motels and hotels.

A further object of this invention is to provide units which may be located in close proximity to the dial telephone instruments used by motel and hotel occupants whereby such units are under the direct manual and visual control of such occupants.

Still another object of this invention is to provide an automatic reminder system which, after being once set to signal the occupant at a predetermined time, may be easily and reliably operated by the occupant to cancel or to correct the previously set reminder time.

Other objects of this invention will be apparent to those skilled in the art from the following detailed description of this invention in certain preferred embodiments and from reference to the attached drawings.

DESCRIPTION OF THE DRAWINGS

In these drawings like reference numerals indicate corresponding parts throughout the several views.

DESCRIPTION OF A PREFERRED EMBODIMENT

Figure 1:
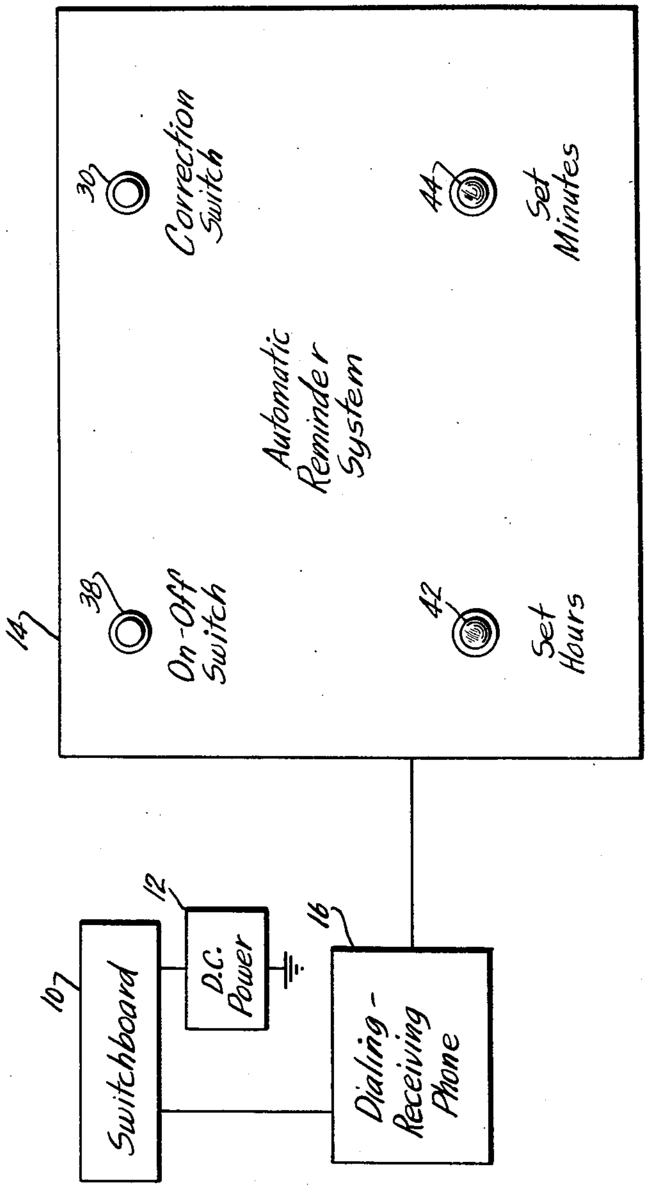
FIG. 1 is a block diagram showing the relationship of the automatic reminder system of this invention to conventional elements of a telephone system including a dial telephone instrument.
Figure 2:
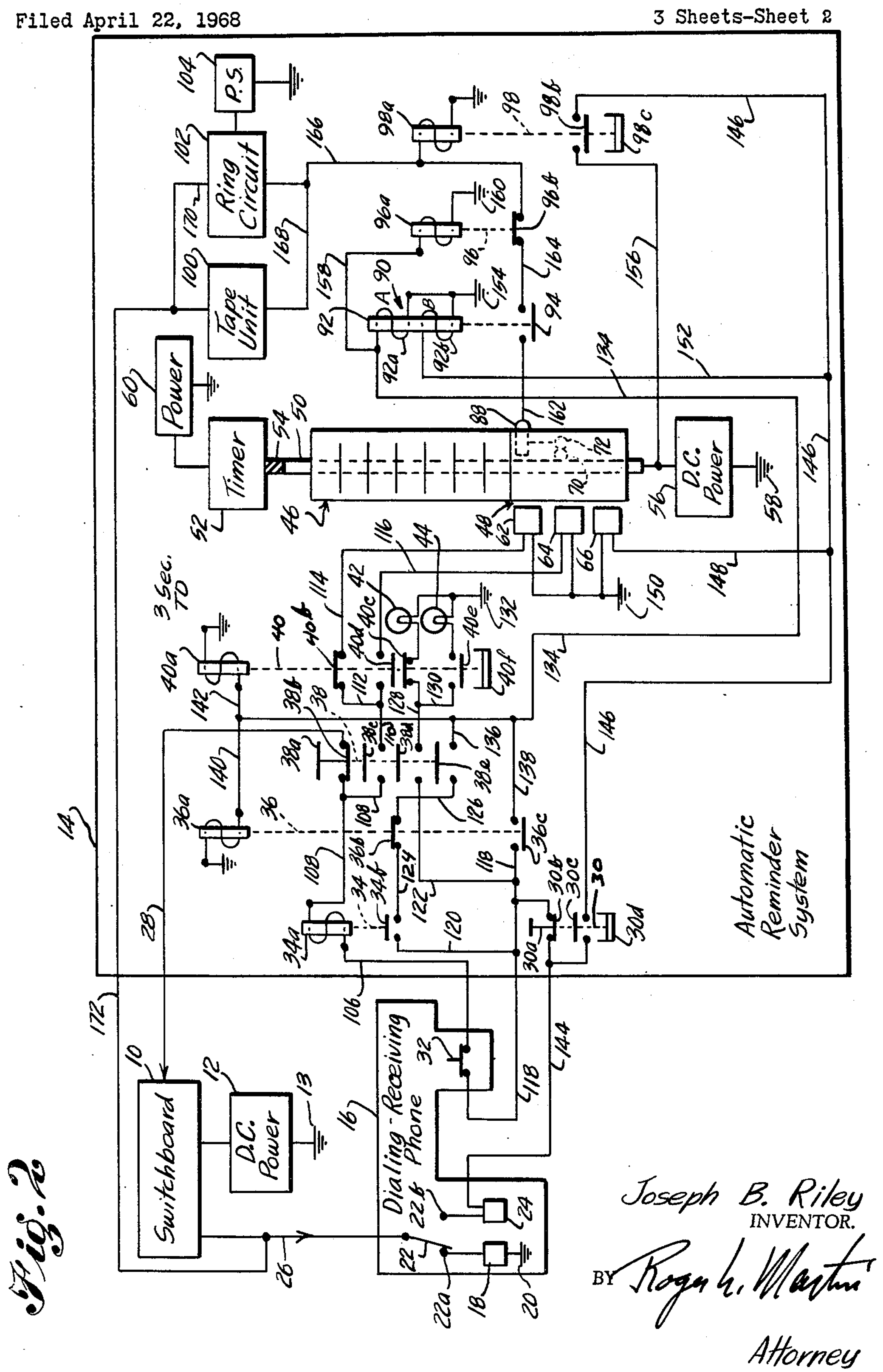
FIG. 2 is a schematic diagram of the automatic reminder system according to the present invention in association with other elements of a conventional telephone system.

Reference is first made to FIGS. 1 and 2 of the drawings wherein, by block diagram and schematic diagram respectively, there is shown the automatic reminder system 14 as a unit which may be connected to a conventional dialing-receiving phone 16 which in turn may be connected to an incoming telephone circuit such as one coming from a switchboard 10 in a motel or hotel, or such as one coming from a trunk line leading to a central office (not shown). The automatic reminder system of this invention is represented by the circuitry contained in the block 14 and its connections with the dial telephone instrument and the incoming telephone circuit. As indicated in FIGS. 1 and 2, the incoming telephone circuit may originate in a conventional telephone switchboard 10 which may be provided with its own source of power as represented by the block 12 which is connected between ground 13 and switchboard 10. When provided, the switchboard 10 and the power supply 12 are usually located near the office of the motel or hotel for operation by suitable personnel.

Blocks 16 of FIGS. 1 and 2 represent conventional dial telephone instruments as part of the usual telephone apparatus as may be found in common practice in a home or in motels and hotels in each room or suite thereof. In FIG. 2, the instrument 16 is shown schematically as comprising a signaling device 18 which is connected to ground 20 and to a single pole double throw switch 22. Switch 22 is normally urged to the position shown in FIG. 2 in engagement with stationary contact **22*a* so as to complete the energizing circuit for signaling device 18. Such switch is actuated to its other position in engagement with stationary contact 22*b* upon removal of a portion of the telephone mechanism as represented schematically at 24. That is, the square 24 represents both the mouth piece and the earpiece of the modern cradle telephone. When this structure is removed from the cradle or support stand (not shown) therefore, the switch 22 is permitted to move into engagement with the stationary contact 22*b*** under the influence of suitable biasing means.

The incoming telephone circuit represented by lead 26 and return lead 28 shown in FIG. 2 as connecting with switchboard 10, normally extends directly to the telephone instrument 16, but, as shown in FIG. 2, the return lead 28 is connected to the telephone instrument through certain elements of the automatic reminder system, i.e. switch contact **38*b*, lead 108, electromagnetic actuator 34*a* and lead 106, for reasons hereinafter to be described. Upon occurrence of the proper signal on the incoming telephone circuit, the signaling means 18 is energized through lead wire 26 and switch 22 positioned to contact point 22*a*. Thereafter when the manual portion 24 of instrument 16 is removed from the support stand as above explained, the switch 22 makes contact with the contact terminal 22*b* to thus connect instrument 16** to the incoming telephone circuit.

The telephone instrument 16 also includes a pulsing switch 32 which is held closed by the apparatus 24, and which is moved to open position upon removal thereof from the support stand (not shown) therefore. Switch 32, as will hereinafter become more apparent, is responsive to actuation of the rotatable dial mechanism found on modern day telephone instruments. It is, of course, obvious to one skilled in the art that the dial mechanism referred to in the description of the preferred embodiment acts as an impulse sending means and accordingly, different types of impulse sending means could be substituted for the dial mechanism. Consequently, any impulse sending means which could be readily adapted to the present invention could cooperate with the telephone instrument and the reminder system in the manner to be described with reference to the dial mechanism. Such switch is pulsed (closed and opened) once for each digit dialed. That is, after the mouth and ear piece 24 is removed from the support stand therefore, it is possible to dial any desired number. To accomplish this, it is merely necessary to rotate the dial mechanism the corresponding amount. When such mechanism is released, the switch 32 is closed and opened in accordance with the amount of return movement of the dial mechanism. As such, in the event the numeral 5 is dialed, upon release of the dial mechanism the switch 32 will be pulsed five times. In like fashion, if the numeral 8 is dialed, the switch 32 will be pulsed 8 times.

The foregoing diagrams and descriptions are not intended to be complete in every detail of a dial telephone system, but rather is intended merely to be a representation of means for performing the usual functions of telephone apparatus.

Turning now to the automatic reminder system 14 of FIG. 2, there is provided a manually operable switch 38 which functions as an "on-off" switch. Said switch 38 comprises a finger-operated lever or button **38*a*, a normally closed contact 38*b* and three normally open contacts 38*c*, 38*d* and 38*e***

There is also provided a manually operable switch 30, functioning as a "correction" switch having a finger operated lever **30*a*, a normally closed contact 30*b* and a normally opn contact 30*c*. Additionally, switch 30 includes means, such as represented by dash-pot 30*d*, for providing a slow release for the contacts 30*b* and 30*c* upon removal of the force on button 30*a*** as will hereinafter be explained.

As also shown in FIGS. 1 and 2, indicator lamps 42 and 44 are provided in the automatic reminder system unit, these lamps serving as "Set Hours" and "Set Minutes" indications respectively for the person operating the automatic reminder system.

A number of electroresponsive switches are utilized as components in the variable circuit controlling means which comprises the automatic reminder system of this invention. These electroresponsive switches are operated by electromagnetic actuators as will now be more fully explained.

To adapt the automatic reminder system of this invention to existing telephone apparatus, and referring more specifically to block 14 of FIG. 2, it is necessary to connect a switch 34 to switch 32. This may be done, as shown, by making switch 34 an electroresponsive switch having an electromagnetic actuator 34a and a normally closed contact 34b. While contact 34b is normally closed, removal of the manual portion 24 of the dial telephone instrument 16 applies current through switch 32 to the electromagnetic actuator 34a thus immediately opening contact 34b. Thereafter, each time switch 32 is moved to its open position (by dialing as has been explained above) current through electromagnetic actuator 34a is interrupted thus moving switch contact 34b to a closed position. Switch 34 is thus pulsed (closed and opened) in response to actuation of the rotatable dial mechanism.

Also included in the automatic reminder system of this invention is an electroresponsive switch 36 having an electromagnetic actuator 36a, a normally closed contact 36b and a normally open contact 36c.

Another electroresponsive switch 40 is provided, this switch comprising an electromagnetic actuator 40a, a pair of normally closed contacts 40b and 40c and a pair of normally open contacts 40d and 40e. In addition, switch 40 comprises time delay means, as represented by the dash-pot 40f, for controlling the response of the switch contacts to energization of actuator 40a as will hereinafter be explained in detail.

Figures 3, 4, 5:
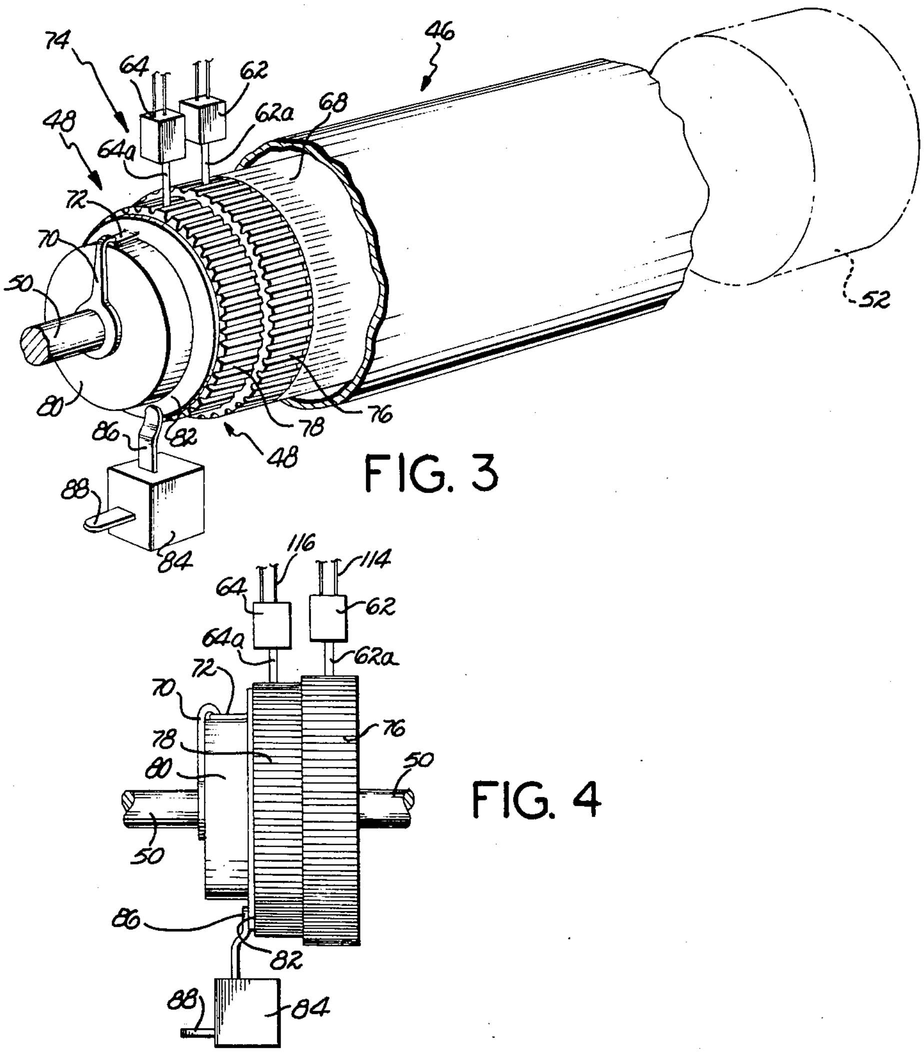
FIG. 3 is a fragmentary perspective view of a timing device used in the automatic reminder system of FIG. 2.
FIG. 4 is a fragmentary side elevational view of a portion of the timing device of FIG. 3.
FIG. 5 is a chart or tabulation of one method for correlating telephone dial digits and time.

The automatic reminder system of this invention includes a timing device which may take substantially any desired form consistent with the functional objectives which will become more apparent during the description of the operation of the entire automatic system. While it is believed that the details of construction of such a timing device are within the skills of persons learned in the subject art, FIGS. 3 and 4 show one form or embodiment of such a timing device.

Referring to FIG. 2 of the drawings, timing device 46 may comprise a plurality of timing units, one of which is illustrated at 48, all of such units being mounted on a common rotatable shaft 50. A timer 52 is provided for rotating shaft 50 at a predetermined angular rate or speed, there being means as indicated at 54 for insulating shaft 50 from the timer 52. Such insulation is desirable, if not mandatory, due to the fact that a power supply 56 is connected between ground 58 and shaft 50 to provide current flow through the latter under certain conditions as will hereinafter be explained.

Timer 52 may have its own power supply as indicated at 60 for rotation of shaft 50 at a constant predetermined rate. In this regard, timer 52 need be little more than an electrically energizable constant speed motor and suitable transmission means whereby shaft 50 is rotated one or more times each 24 hour period as desired, and as will hereinafter become more apparent.

Operatively associated with timing unit 48 of timing device 46 are three electromagnetic actuators 62, 64 and 66.

Referring to FIGS. 3 and 4 of the drawings, the timing device comprises the aforementioned shaft 50 and drum unit 68 which is rotatable with respect to shaft 50. The timer 52 is operable to rotate the shaft 50 while the drum unit 68 remains in fixed position.

Drum unit 68 is divided into a plurality of coaxially arranged and axially spaced timer units, one of which is shown at 48. Each such timer unit includes a pair of contacts 70 and 72. The first of said contacts, 70, is mechanically and electrically secured to shaft 50 and rotates therewith. The position of the second contact, 72, may be varied relative to the position of the first contact by means 74 which may take substantially any desired form whereby the contact 72 may be moved in accordance with the number of electrical pulses generated by a dial telephone instrument as will hereinafter become more apparent. For purposes of illustration, the mechanism 74 as is shown in FIG. 3 comprises a pair of rotatable members 76 and 78 each of which is formed with gear teeth around its periphery. The electromagnetic actuators 62 and 64 are associated respectively with rotatable members 76 and 78, and have plungers as shown respectively at 62a and 64a. Such plungers cooperate with the gear teeth on the respective rotatable members, and are intended to illustrate that each time one of the electromagnetic actuators 62 and 64 receives an electrical pulse, the respective plunger is actuated to permit the corresponding rotatable member to rotate a fixed angular distance. To accomplish this, there may be associated with rotatable members 76 and 78 suitable rotating means (not shown) which may take the form of a torsion spring or the like.

The contact 72, referenced above as the second contact, is fixed relative to members 76 and 78. That is, the contact 72 is provided with a given initial or reference position, and thereafter is moved a distance corresponding to the number of electrical pulses received by actuators 62 and 64, as will hereinafter be explained in detail.

The contact 72 rests upon an insulating member 80, and a commutator ring 82 is provided thereabout and in electrical continuity with contact 72. A connector 84 having a brush 86 in constant engagement with commutator ring 82 is provided for completing the circuit to contact 72 as will hereinafter appear. A terminal lug 88 is provided as part of connector 84 in circuit with brush 86.

It is thus seen that the timing device 46 comprises, for each of its timing units, a pair of relatively movable electrical contacts the first of which 70 moves at a constant rate of speed and the second of which is adjustably positioned in accordance with the number of electrical pulses generated by operation of a dial mechanism of a telephone instrument. Relating this to timing unit 48 the shaft 50 and hence the first contact 70 are rotated by timer 52 at a constant rate of speed. The second contact 72 is angularly positionable in accordance with the number of pulses received by actuators 62 and 64. When contact 70 engages contact 72, of course, an electrical circuit is completed from shaft 50 to terminal lug 88 through the commutator ring 82 and brush 86.

Also included as part of the automatic reminder system, is a latching relay 90 having an actuator 92, comprised of windings 92a and 92b, and a normally open contact 94. Latching relay 90 is so constructed that energization of winding 92a closes the normally open contact 94 and energization of winding 92b is necessary to return it to open position.

An electroresponsive switch 96 is also provided, said switch having an electromagnetic actuator 96a and a normally closed contact 96b.

Another electroresponsive switch 98 is provided in the automatic reminder circuit. Said switch 98 has an electromagnetic actuator 98a, and a normally open contact 98b, the latter of which is also under control of time delay means as represented by the dash-pot 98c.

A signalling device including a ring circuit 102 having its own power supply 104 is provided for the automatic reminder system. A message playback unit 100 such as a tape unit may also be included in the circuit.

Referring now more specifically to the electrical connections between the various components of the variable circuit controlling means comprising the automatic reminder system of this invention, which have been identified hereinabove, lead wire 106 connects the switch 32 to the electromagnetic actuator 34a and thence, by lead 108 to one side of normally closed contact 38b of switch 38, the other side of this contact being connected to lead wire 28 to thus provide the return circuit from the dial telephone instrument 16 to the incoming telephone circuit or switchboard 10, as has been previously described. Lead wire 108 from electromagnetic actuator 34a also connects to one side of normally open contact 38c, the opposite side of the latter being connected to contacts 40b and 40d by lead wires 110 and 112. Contacts 40b and 40d are then connected respectively to electromagnetic actuators 62 and 64 by lead wires 114 and 116.

The normally closed contact 30b of manually operable "correction" switch 30 is connected between contact 22b of switch 22 through the manual portion 24 of instrument 16 as explained above and the normally closed switch 32. A lead wire 118 connects contact **30*b* with switch 32 and with normally opened contact 36*c* of electromagnetic switch 36. In like fashion, a lead wire 120 connects normally open switch 34 to lead wire 118, and a lead wire 122 connects the said lead wire 118 to one side of normally open contact 38*d*. Lead wires 124 and 126 connect normally closed contact 36*b* in series with switch 34 and to one side of normally open contact 38*e***.

Lead wires 128 and 130 connect contacts **40*c* and 40*e* to one side of contact 38*d*. The indicator lamps 42 and 44 are connected to contacts 40*c* and 40*e* respectively and to ground potential as indicated at 132**.

One side of contact **38*e* is connected to a lead wire 134 by a lead wire 136. In like fashion a lead wire 138 connects one side of normally open contact 36*c* to said lead wire 134. The latter wire is connected to lead wires 140 and 142 which lead respectively to the energizing coils for electromagnetic actuators 36*a* and 40*a* of switches 36 and 40**.

A lead wire 144 connects one side of normally closed contact **30*b* to one side of normally open contact 30*c* of switch 30. The other side of the latter contact is connected by lead wires 146 and 148 to electromagnetic actuator 66. Each of the actuators 62, 64 and 66 is grounded as at 150**.

One end of lead wire 134 is connected to one side of winding **92*a* whereas a lead wire 152 interconnects lead wire 146 and one side of winding 92*b*. The other side of each of these windings is grounded as indicated at 154. The lead wire 146 terminates at one side of normally open contact 98*b* of electromagnetic switch 98. The other side of said contact is connected to power supply 56 through a lead wire 156**.

A lead wire 158 connects one side of winding **92*a* to one side of the winding of electromagnetic actuator 96*a*. The other side thereof is grounded at 160**.

As shown at FIG. 2, the terminal lug 88 is connected to one side of the normally open contact 94 by a lead wire 162. The other side of contact 94 is connected to one side of normally closed contact **96*b* by a lead wire 164. A lead wire 166 then interconnects contact 96*b*, electromagnetic actuator 98*a* and the ring circuit 102. A lead wire 168 connects the tape or record playing unit 100 to the lead wire 166**.

The signaling or ring circuit 102 and the tape or record playing unit 100, of course, are operatively associated with the telephone apparatus so as to perform their intended functions through such apparatus. Accordingly, connection means in the form of a lead wire 170 is shown interconnecting ring circuit unit 102 to lead wire 172, and thence to lead wire 26 connecting to the dialing-receiving phone 16, while lead wire 172 is shown as also connecting record tape unit 100 to lead wire 26.

MODE OF OPERATION

The automatic reminder system of the present invention operates generally as follows.

The instrument 16 is readily available for all of its usual functions, namely for receiving and sending messages. That is, in the event a call is to be received by the instrument 16, a signal is received through lead wire 26 from an incoming telephone circuit, which may be a trunk line or from switchboard 10. As a result, the signaling device 18 is energized. When the instrument 24 is picked up, the switch 22 is moved into engagement with contact **22*b* so as to complete the circuit to the incoming telephone circuit through contact 30*b*, switch 32, lead wire 106, actuator 34*a*, lead 108, contact 38*b* and lead wire 28. In this manner, the instrument 16** functions in the usual fashion to receive calls.

In the event it is desired to place a call from instrument 16, it is merely necessary to pick up the unit 24 so as to complete the aforementioned circuitry between instrument 16 and the incoming telephone circuit. Thereafter, the dial mechanism of instrument 16 can be suitably manipulated so as to cause switch 32 to send the appropriate number of electrical pulses back through the incoming telephone circuit. The source of power for such operation may originate from any appropriate location, e.g. through the incoming telephone circuit in accordance with good telephone installation practices.

To initiate the time-setting operation of the automatic reminder system, it is first necessary to place the "on-off" switch means 38 in its "on" position using switch button or lever **38*a*. This moves contact 38*b* to its open circuit position and moves contacts 38*c*, 38*d* and 38*e* to their respective closed circuit positions. Movement of contact 38*b* to its open position, of course, opens the incoming telephone circuit between the telephone instrument 16 and lead wire 28. Thus, when the mouth and ear piece 24 of the instrument 16 is subsequently removed from its support means, such instrument is no longer connected with the incoming telephone circuit. Rather, due to the fact that contact 38*c* is now in its closed position, the instrument 16 is connected to the timing device, more specifically in the embodiment illustrated, to electromagnetic actuator 62 through normally closed contact 40*b*. Power for operating actuators 62, as well as actuators 64 and 66 as will hereinatfer appear, can be supplied through line 26 of the incoming telephone circuit, since removal of the mouth and ear piece 24 moves switch 22 into engagement with contact 22*b*, or the power may be supplied from a power supply separate from the telephone apparatus (not shown). It is therefore readily apparent that upon actuation of switch means 38** to its "on" position, the automatic reminder system is disconnected from and consequently operates independently of any central office telephone call switching facility. A central office telephone call switching facility in this sense to mean any outside switchboard located in the particular building in which the present invention is being utilized as well as any telephone trunk line which may be a part of a main telephone call switching facility remotely located from the building or location in which the present invention is being utilized.

With connections now complete from switch 32 through lead 106, actuator **34*a*, lead 108, contact 38*c* and 40*b* to actuator 62, it is merely necessary to pulse this actuator by switch 32, the dialing instrument, the proper number of times to cause it to position contact 72** at the proper "hour" location.

To accomplish this, reference is made to FIG. 5 of the drawings which shows one proposed system for allocating the ten numerals on a telephone dial to the twelve different hours. If it is desired to position contact 72 in the proper position so that it will be engaged by contact 70 at 4:00 o'clock, it is merely necessary to locate the four o'clock indication on the chart and to note the digit indication thereat. Thus, it is seen that the digit 4 is to be dialed to provide the necessary number of pulses to actuator 62 to cause the rotatable member 76 of the timer 46 to be rotated sufficiently to locate contact 72 accordingly. In like manner, if it is desired to adjust contact 72 so that it will be engaged by movable contact 70 at 11:00 o'clock, it is merely necessary to dial 0 and 1.

When the dial mechanism or similar impulse sending means associated with instrument 16 is thus manipulated as desired, to pause switch 32 and accordingly switch 34 to operate a corresponding number of times. Thus, the circuit leading to actuator 62 is pulsed the proper number of times to position contact 72 accordingly.

Throughout the time setting operation of the reminder apparatus, the "on-off" switch 38 remains in an "on" position until it is manually returned to its original "off" condition following such time-setting. As a result, contact **38*d* remains closed so as to apply current to "set-hours" indicator lamp 42 through lead wire 122, contact 38*d*, lead wire 128, and contact 40*c***. Such lamp indicates that the time-setting operation for the "hour" digit is in process.

The initial closure of switch 34 which has been opened upon the lifting of the telephone instrument and which pulses closed and open with the dialing switch 32 of the telephone instrument, applies energizing current to the electromagnetic actuators 36*a* and 40*a* of switches 36 and 40 respectively. Such energizing current flows from lead wire 118 through lead wire 120, contact 34*b*, lead wire 124, contact 36*b*, lead wire 126, contact 38e, lead wires 136 and 134, and the respective lead wires 140 and 142. Energization of electromagnetic actuator 36*a* immediately opens contact 36*b* and closes contact 36*c*. The latter contact provides a holding circuit through lead wire 138 to the acutators 36*a* and 40*a* to provide a constant flow of current thereto in spite of the pulsing operation of switch 34.

Energization of actuator 40*a*, however, does not immediately actuate the corresponding contacts. Rather, the time delay mechanism as represented by dash-dot 40*f* provides a delay in the response of the contacts of switch 40 to energization of actuator 40*a*. It has been found that three second time delay is desirable under most conditions.

At the end of such time delay, contacts 40*b* and 40*c* are moved to their open circuit positions while contacts 40*d* and 40*e* are moved to their closed circuit positions. The opening of the former contacts merely opens the energizing circuits for electromagnetic actuators 62 and the indicator lamp 42. Closure of contacts 40*d* and 40*e*, however, completes the energizing circuits to electromagnetic actuator 64 and to the "set minutes" indicator lamp 44. Thus, since the "hour" setting has been accomplished, the mechanism has now automatically switched over to the conditions necessary for time-setting the "minutes" or fractions of an hour.

Referring again to FIG. 5 of the drawings, the two right hand columns show one proposed system for allocating the digits on the dial of the telephone instrument to various fractions of an hour. Such tabulation shows the hour broken into six ten minute intervals. Thus, if it has been decided to have the reminder system operate at 4:20 o'clock, and the rotatable member 76 has already been set in accordance with the 4:00 o'clock setting, it is then necessary to dial the digit 2 in order to set the timing device for 20 minutes after the hour. Thus by dialing the digit 2, the switch 32 is caused to pulse the energizing circuit for actuator 64 a corresponding number of times. Such circuit, of course, includes contacts 30*b*, switch 32, contact 38*c*, and contact 40*d*. Such pulsing of actuator 64, as above described, causes rotatable member 78 to be rotated the proper angular distance so as to further position contact 72.

Closure of contact 40*e*, of course, energizes "set minutes" indicator lamp 44 to show that the mechanism is in process of being set according to the "minute" setting. Both of the indicator lamps 42 and 44 are part of the automatic reminder system unit which accordingly must be located in close proximity to the dial telephone instrument 16 such that they may be readily seen while operating the telephone instrument for the purpose of this invention.

The timing device 46 having been set in accordance with the procedures outlined above, the telephone instrument 16 may be returned to normal use by merely returning the manually operable "on-off" switch 38 to its original "off-on" position. Such operation, of course, restores the connection of the telephone instrument 16 to the incoming telephone circuit through lead wire 106, actuator 34*a*, lead wire 108, switch contact 38*b* and lead wire 28. Thus the telephone instrument 16 may be used to receive incoming telephone calls or to make outgoing telephone calls in the normal manner as has been described hereinabove during the period between setting the automatic reminder system and being reminded thereby.

If at any time it becomes desirable to cancel or correct the time-setting operation, it is merely necessary to manually operate "correction" switch 30. Such operation may be found necessary due to a desire to cancel or change the predetermined time of being reminded or due to an error in dialing either the "hour" or "minute" settings. Such errors may frequently occur in hotels or motels as a result of the stress and strain or other factors affecting occupants thereof; the provision of a "correction" switch under the control of the occupant and manually operative through the simple motion of a finger-operated lever 30*a*, is an essential and important component of the automatic reminder system of this invention. Opening of contact 30*b*, of course, de-energizes the time-setting mechanism, including electromagnetic actuator 36*a* and 40*a* of switches 36 and 40. Also closure of contact 30*c* effects energization of return actuator 66 through lead wires 144, 146 and 148. Actuator 66 is thereby caused to return contact 72 to its initial reference position. Actuator 66 may be associated with a third rotatable member in the timing unit 48 so as to permit contact 72 to be returned by suitable means (not shown) to its initial reference position.

To allow sufficient time for contact 72 to be returned, switch 30 is prevented from returning to its original position for a short period of time as provided by time delay mechanism 30*d*. However, once such time delay has taken place, the switch 30 returns to its initial position and the operator of the telephone instrument 16 is free to again begin the time-setting operation.

Simultaneous with energization of actuators 36*a* and 40*a* as above described, is energization of electromagnetic winding 92*a* of latching relay 90 and electromagnetic actuator 96*a* of switch 96. Energization of winding 92*a* moves contact 94 to its closed position where it is latched so as to be held closed until winding 92*b* is subsequently energized. Energization of actuator 96*a* moves contact 96b to open circuit condition so that the message playback circuit, to be hereinafter described, remains open throughout the time-setting operation notwithstanding the fact that contact 94 is closed. Following completion of the time-setting operation, however, contact 96*b* is returned to its closed position due to de-energization of actuator 96*a*.

With the playback circuit thus set, the entire reminder system remains de-energized until contact 70 moves into engagement with contact 72. When this occurs, energizing current flows from power supply 56 through shaft 50, contacts 70 and 72, commutator ring 82, brush 86, terminal lug 88, lead wire 162, contact 94, lead wire 164, contact 96*b*, and lead wire 166 to the ring circuit 102. Also, the message playback unit 100 is simultaneously energized through the aforementioned circuit and lead wire 168. The ring circuit 102 signals the telephone instrument 16 through lead wires 170, 172 and 26. As soon as the instrument is picked up, the tape unit 100 transmits a recorded message through lead wires 172 and 26 to the instrument 16. In this manner, the person at the instrument is notified of the occurrence of the preselected time at which he desired to be called.

Engagement of contacts 70 and 72 also energizes electromagnetic actuator 98*a*. However, contact 98*b* of switch 98 is under control of a time delay mechanism 98*c* so that it is not moved immediately to its closed position. Rather, it has been found desirable to have contact 98*b* subject to a two minute time delay. Thus, sufficient time is allowed for the instrument 16 to be answered in response to operation of ring circuit 102 as above described. However, following such two minute time delay, the contact 98*b* moves to its closed circuit position thereby energizing return actuation 66 from power supply 56. Such energization takes place through the circuit comprising lead wire 156, contact 98*b*, lead wire 146 and lead wire 148. Energization of actuator 66, of course, returns contact 72 to its initial reference position, thereby separating the contacts 70 and 72 so as to interrupt the aforedescribed playback circuit.

Simultaneous with energization of actuator 66 is energization of winding 92b of latching relay 90. This, of course, releases contact 94 for return to its open circuit condition as shown in FIG. 2.

It is thus seen that the subject reminder system is operable to automatically signal the given telephone instrument at the proper preselected time. Also, upon removal of the receiver of the instrument, a reminder message is transmitted. Further, the entire mechanism is automatically returned to its initial condition so that a new time can be set whenever desired merely by following the above described procedure.

It is thus seen that the present invention provides an automatic system which can be added to existing telephone apparatus or can be incorporated into new telephone installations if desired.

What is claimed as new and what it is desired to secure by Letters Patent of the United States is:

1. An automatic signaling system including an incoming telephone circuit, a telephone instrument connected to said telephone circuit including an impulse sending device, and an automatic reminder system connected to said telephone instrument, said automatic reminder system comprising: a variable circuit controlling means operable independent of a central office telephone call switching facility to provide a signal at said telephone instrument at a predetermined time, said automatic reminder system including a timing means and a first switch means, said first switch means being actuatable independent of said impulse sending device to open said incoming circuit and connect said timing means in circuit to said telephone instrument, said timing means being responsive to operation of said impulse sending device, upon actuaton of said first switch means to vary said predetermined time of operation of said circuit controlling means.

2. An automatic signaling system as in claim 1 wherein said automatic reminder system further comprises: a second switch means actuatable independent of said impulse sending device to open the circuit between said impulse sending device and said timing means so as to cancel operation of said variable circuit controlling means, whereby said timing means is restored to its initial setting.

3. An automatic signaling telephone system comprising the combination in accord with claim 1, including means responsive to the circuit controlling means at the time of said signal and automatically operable thereafter to render said variable circuit controlling means inoperative to thereafter signal said instrument without prior operation of said timing means.

4. An automatic signaling telephone system comprising the combination in accord with claim 1, said timing means having a first and second electrical contact, the first contact being automatically movable at a predetermined rate into contact with the second contact, means for automatically varying the position of the second contact with respect to the first contact and from a predetermined reference position in response to actuation of said impulse sending device, and signal producing means connected to said telephone instrument and responsive to engagement of said first and second contacts for providing said signal.

5. An automatic signaling telephone system comprising the combination in accord with claim 4 and further comprising means for returning said second contact to its predetermined reference position following provision reception of said signal at said telephone instrument.

6. An automatic signaling telephone system comprising the combination in accord with claim 4, and further comprising a message playback unit connected to said instrument and responsive to engagement of said contacts whereby the signaling means at said telephone instrument and said message playback unit are simultaneously actuated and the message playback unit provides a predetermined message for a person answering said telephone instrument.

7. An automatic signaling telephone system comprising the combination in accord with claim 1, said timing means having a first and second electrical contact and a motor for moving the first contact into engagement with the second contact at a predetermined rate, and electroresponsive actuating means cooperating with said timing means for varying the relative position of the second contact with respect to the first contact to thereby change the selected time of engagement thereof, said electroresponsive actuating means being connectable in circuit with said telephone instrument upon actuation of said first switch means whereby actuation of said impulse sending device causes said electroresponsive actuating means to be pulsed in accordance with the operation of said impulse sending device.

8. A telephone system comprising the combination in accord with claim 7 wherein said electroresponsive actuating means comprises a pair of electroresponsive devices each of which is responsive to operation of the impulse sending device of said telephone instrument, said electroresponsive devices being operatively associated with said timing means such that one of said electroresponsive devices controls the number of hours prior to engagement of said first and second contacts, while the other of said electroresponsive devices further controls fractions of hours prior to engagement of said first and second contacts.

9. A telephone system comprising the combination in accord with claim 8 wherein the second of said contacts has a predetermined reference position from which said electroresponsive devices move said second contact in response to actuation of said impulse sending device.

References Cited

UNITED STATES PATENTS

| | | | |
|---|---|---|---|
| 1,302,767 | 5/1919 | Clausen | 179—18 |
| 2,901,542 | 8/1959 | Henches et al. | 179—6 |
| 3,046,339 | 7/1962 | Breen et al. | 179—2 |

FOREIGN PATENTS

| | | |
|---|---|---|
| 1,096,429 | 1/1961 | Germany. |

JAMES W. MOFFITT, Primary Examiner

R. F. CARDILLO, Jr., Assistant Examiner

U.S. Cl. X.R.

179—2